(12) United States Patent
Manchi

(10) Patent No.: US 12,430,732 B2
(45) Date of Patent: Sep. 30, 2025

(54) HIGH DYNAMIC RANGE (HDR) IMAGE PROCESSING WITH ADAPTIVE COLOR VOLUME MAPPING

(71) Applicant: Synaptics Incorporated, San Jose, CA (US)

(72) Inventor: Chandranath Manchi, Bangalore (IN)

(73) Assignee: Synaptics Incorporated, San Jose, CA (US)

( * ) Notice: Subject to any disclaimer, the term of this patent is extended or adjusted under 35 U.S.C. 154(b) by 134 days.

(21) Appl. No.: 18/322,926

(22) Filed: May 24, 2023

(65) Prior Publication Data

US 2024/0394857 A1 Nov. 28, 2024
US 2025/0259284 A9 Aug. 14, 2025

(51) Int. Cl.
*G06T 5/92* (2024.01)
*G09G 5/06* (2006.01)

(52) U.S. Cl.
CPC .............. *G06T 5/92* (2024.01); *G09G 5/06* (2013.01); *G06T 2207/10024* (2013.01);
(Continued)

(58) Field of Classification Search
CPC ....... G09G 2320/0242; G09G 2340/06; G09G 2360/16; G09G 5/026; G09G 2320/0271;
(Continued)

(56) References Cited

U.S. PATENT DOCUMENTS

| 7,903,178 B1 | 3/2011 | Balram et al. | |
|---|---|---|---|
| 2009/0002475 A1* | 1/2009 | Jelley | H04N 7/142 348/E7.078 |

(Continued)

FOREIGN PATENT DOCUMENTS

| CN | 107203974 A | 9/2017 |
|---|---|---|
| CN | 107852501 A | 3/2018 |

(Continued)

OTHER PUBLICATIONS

BT Series "Methods for Conversion of High Dynamic Range Content to Standard Dynamic Range Content and Vice-versa." pp. 1-33, 2019.

(Continued)

*Primary Examiner* — Muhammad N Edun
(74) *Attorney, Agent, or Firm* — Paradice & Li LLP

(57) ABSTRACT

This disclosure provides methods, devices, and systems for color volume mapping (CVM) techniques that operate in the $J_z a_z b_z$ color space. In some aspects, an image processor may receive image data having color channels associated with a color space that is not perceptually uniform and may convert the image data to the $J_z a_z b_z$ color space. The image processor may perform a global CVM operation which maps a range of $J_z$, $a_z$, and $b_z$ values supported by the image source to a range of $j_z$, $a_z$, and $b_z$ values supported by the image target. The image processor may further perform a local CVM operation which adaptively tunes the $J_z$, $a_z$, and $b_z$ channels of image data based on various properties of the received image. Still further, the image processor may adaptively blend $J_z$ values at the edges of objects and other features to preserve details in low-contrast regions of the received image.

20 Claims, 9 Drawing Sheets

(52) U.S. Cl.
CPC .............. *G06T 2207/20208* (2013.01); *G09G 2320/0242* (2013.01); *G09G 2340/06* (2013.01); *G09G 2360/16* (2013.01)

(58) Field of Classification Search
CPC .... G09G 5/02; G09G 2320/0238; G09G 5/06; G09G 5/005; G06T 2207/20084; G06T 5/92; G06T 2207/10024; G06T 2207/20208; G06T 5/60

See application file for complete search history.

(56) References Cited

U.S. PATENT DOCUMENTS

| | | |
|---|---|---|
| 2014/0152686 A1 | 6/2014 | Narasimha et al. |
| 2015/0237322 A1 | 8/2015 | Stec et al. |
| 2015/0245043 A1 | 8/2015 | Greenebaum et al. |
| 2015/0245044 A1 | 8/2015 | Guo et al. |
| 2016/0093029 A1 | 3/2016 | Micovic et al. |
| 2016/0360213 A1 | 12/2016 | Lee et al. |
| 2017/0078706 A1 | 3/2017 | Van Der Vleuten et al. |
| 2017/0186141 A1 | 6/2017 | Ha et al. |
| 2018/0242006 A1 | 8/2018 | Kerofsky et al. |
| 2018/0276801 A1 | 9/2018 | Stessen |
| 2018/0367778 A1 | 12/2018 | Borer |
| 2019/0116349 A1 | 4/2019 | Thompson |
| 2019/0356891 A1* | 11/2019 | Zhang .................. H04N 1/6061 |
| 2020/0099908 A1* | 3/2020 | Stessen .................... H04N 1/64 |

FOREIGN PATENT DOCUMENTS

| | | |
|---|---|---|
| GB | 2608990 A | 1/2023 |
| WO | 2016124942 A1 | 8/2016 |

OTHER PUBLICATIONS

International Search Report and Written Opinion dated Aug. 14, 2019, issued in Intl. Appl. No. PCT/US2019/030668, pp. 1-10.

Safdar et al., "Perceptually Uniform Color Space for Image Signals Including High Dynamic Range and Wide Gamut," Optics Express 15131, vol. 25, No. 13, pp. 1-22, Jun. 26, 2017.

Rus, Jacob, Jzazbz Color Space, https://observablehq.com/@jrus/jzazbz, pp. 1-6, 2017.

U.S. Appl. No. 16/370,608, filed Mar. 29, 2019, pp. 1-53.

Extended EP Search Report dated Oct. 21, 2024, from EP Application No. 24177218.5-1207.

\* cited by examiner

HIGH DYNAMIC RANGE (HDR) IMAGE PROCESSING WITH ADAPTIVE COLOR VOLUME MAPPING

TECHNICAL FIELD

The present implementations relate generally to image processing, and specifically to high dynamic range (HDR) image processing with adaptive tone and color volume mapping.

BACKGROUND OF RELATED ART

Display devices (such as televisions, set-top boxes, computers, and mobile phones) may use different imaging technologies than those used by image capture devices (such as cameras and video recorders). Advancements in display technologies have resulted in improved capabilities such as high dynamic range, wider color gamut and migration from high definition (HD) display to ultra-high definition (UHD) display technologies. As a result, image processing may be used to properly render, on a given display, images captured by devices with different system capabilities and standards. For example, a display device that is capable of displaying only standard dynamic range (SDR) content may be unable to reproduce the full range of color, brightness, or contrast of images captured in a high dynamic range (HDR) format. An image processor may modify the raw image data produced by an image capture device so that the image can be reproduced more accurately or realistically on the display device (such as to utilize the full dynamic range of the display).

Some image processing techniques (also referred to as "tone mapping") may reduce the color, brightness, or contrast of an HDR image to be rendered on an SDR display. Some other image processing techniques (also referred to as "inverse tone mapping") may increase the color, brightness, or contrast of an SDR image to be rendered on an HDR display. Even when the image capture and display devices both support HDR, image processing can further enhance the quality of the displayed image due to differences between the display environment (such as a television with electronically-limited brightness, color, contrast, and resolution) and the image capture environment (such as a natural environment with unlimited brightness, color, contrast, and resolution). As image capture and display technologies continue to evolve, new image processing techniques are needed to bridge the capabilities (such as dynamic range or color gamut) between image capture and display devices.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of image processing. The method includes receiving first image data representing an image produced by an image capture device based on an opto-electrical transfer function (OETF); transforming the first image data into second image data based on an inverse of the OETF, where the second image data includes red (R), green (G), and blue (B) channels associated with an RGB color space; converting the second image data to third image data having lightness ($J_z$), redness-greenness ($a_z$), and yellowness-blueness ($b_z$) channels associated with a $J_z a_z b_z$ color space; mapping the $J_z$, $a_z$, and $b_z$ channels of the third image data to $J_z$, $a_z$, and $b_z$ channels of display data based at least in part on a dynamic range or color gamut associated with a display device; and processing the display data for display by the display device.

Another innovative aspect of the subject matter of this disclosure can be implemented in an image processor including a processing system, comprising a hardware process and software process, which cause the image processor to receive first image data representing an image produced by an image capture device based on an OETF; transform the first image data into second image data based on an inverse of the OETF, where the second image data includes red (R), green (G), and blue (B) channels associated with an RGB color space; convert the second image data to third image data having lightness ($J_z$), redness-greenness ($a_z$), and yellowness-blueness ($b_z$) channels associated with a $J_z a_z b_z$ color space; map the $J_z$, $a_z$, and $b_z$ channels of the third image data to $J_z$, $a_z$, and $b_z$ channels of display data based at least in part on a dynamic range or color gamut associated with a display device; and process the display data for display by the display device.

BRIEF DESCRIPTION OF THE DRAWINGS

The present implementations are illustrated by way of example and are not intended to be limited by the figures of the accompanying drawings.

DETAILED DESCRIPTION

Figure 1:
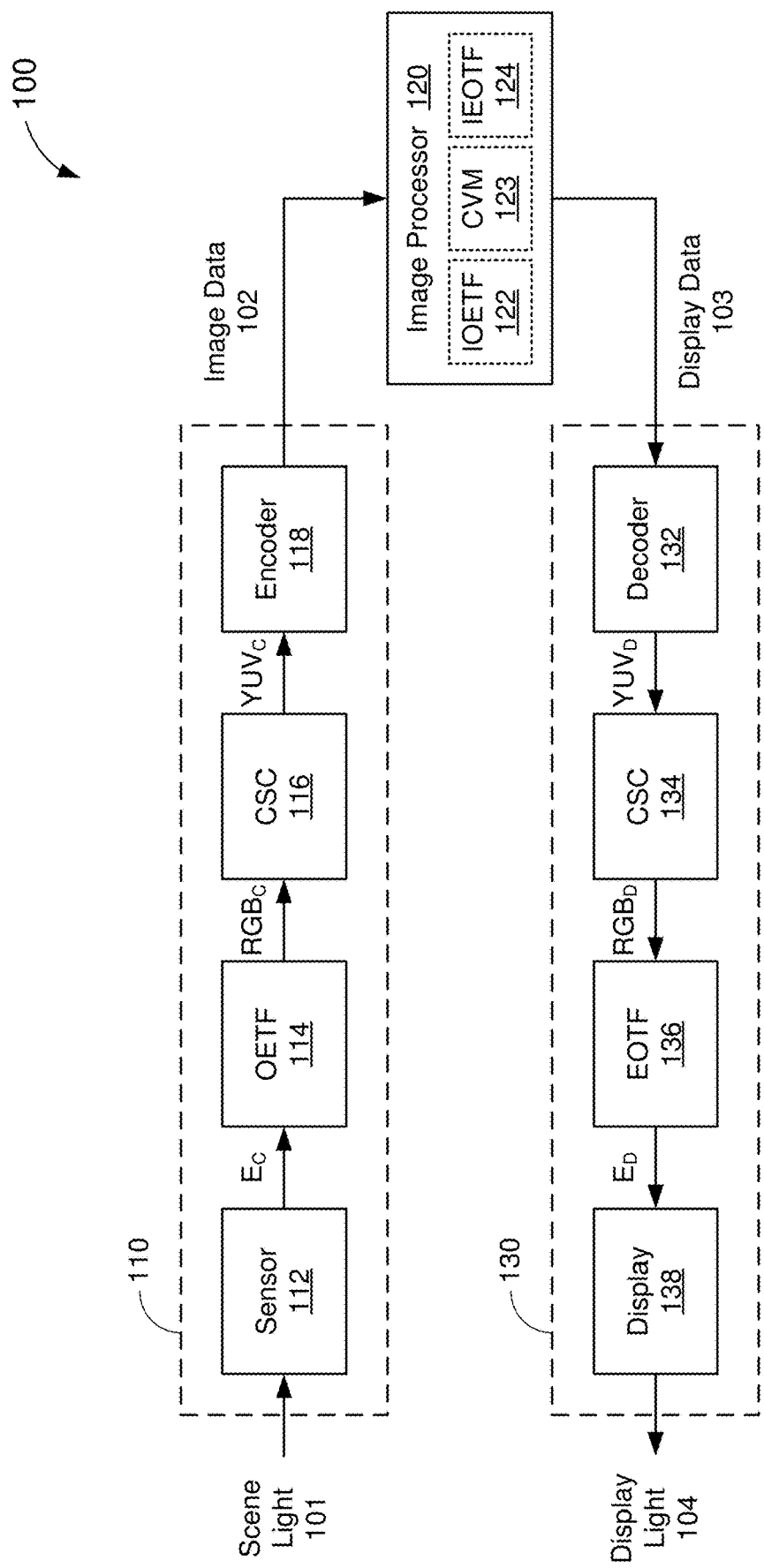
FIG. 1 shows a block diagram of an example image capture and display system, according to some implementations.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, image processing may be used to properly render, on a given display, images captured by devices with different system capabilities and standards. More specifically, an image processor may modify the raw image data produced by an image capture device so that the image can be reproduced more accurately or realistically on the display device (such as to utilize the full dynamic range of the display). Many existing image capture and display devices are configured to process image data having luma (Y) and chrominance (UV) color channels. As such, many existing image processors are designed to perform tone mapping or inverse tone mapping operations in a YUV color space. However, the Y and UV color channels are not perfectly orthogonal. In other words, changing the dynamic range of the Y component of a given image also changes the saturation of any distinguishable hue by a variable amount. Thus, performing tone mapping or inverse tone mapping in the YUV color space may impose a significant penalty on quality, latency, memory, and processing resources, which may not be suitable for many image processing applications (such as for processing video or for implementation in battery-powered devices or other edge devices with limited resources).

Aspects of the present disclosure recognize that image processing overhead can be significantly reduced, without loss of accuracy, by performing tone mapping and inverse tone mapping operations in a perceptually uniform color space (UCS). A UCS is any color space in which the geometric distance between any two points in the color space reflects an equal amount of change in perceived color. An example suitable UCS for tone mapping and inverse tone mapping is the $J_z a_z b_z$ color space, which is defined by lightness ($J_z$), redness-greenness ($a_z$), and yellowness-blueness ($b_z$) color components.

Various aspects relate generally to image processing, and more particularly, to color volume mapping (CVM) techniques that operate in the $J_z a_z b_z$ color space. In some aspects, an image processing system may receive image data having color channels associated with a color space that is not perceptually uniform (such as RGB or YUV) and may convert the image data to the $J_z a_z b_z$ color space. In some implementations, the image processing system may perform a global CVM operation which maps a range of $J_z$, $a_z$, and $b_z$ values supported by the image source (such as an image capture device) to a range of $j_z$, $a_z$, and $b_z$ values supported by the image target (such as a display device). In some other implementations, the image processing system may further perform a local CVM operation which adaptively tunes the $J_z$, $a_z$, and $b_z$ channels of image data based on various properties of the received image. Still further, in some implementations, the image processing system may adaptively blend $J_z$ values at the edges of objects and other features to preserve high-frequency details in low-contrast regions of the received image.

Particular implementations of the subject matter described in this disclosure can be implemented to realize one or more of the following potential advantages. By processing image data in a perceptually uniform color space (such as $J_z a_z b_z$), aspects of the present disclosure may substantially reduce the latency and computational load of CVM operations (such as tone mapping and inverse tone mapping) without loss of accuracy. For example, unlike the YUV color space, the $J_z a_z b_z$ color space is a perceptually uniform color space. As such, tone mapping and inverse tone mapping operations can be performed using two-dimensional (2D) lookup tables (LUTs) in the $J_z a_z b_z$ color space (compared to 3D LUTs which are generally used for tone mapping and inverse tone mapping operations in the YUV color space). Additionally, aspects of the present disclosure support high data precision for video processing and provide a wide range of programming options and hardware flexibility. Thus, the CVM techniques of the present implementations may be suitable for limited-area, low-latency applications (such as set-top boxes, digital televisions, streaming devices, and other video applications) or devices with limited memory or processing resources (such as low-power edge devices).

FIG. 1 shows a block diagram of an example image capture and display system 100, according to some implementations. The system 100 includes an image capture device 110 (also referred to as an "image source"), an image processor 120, and a display device 130 (also referred to as an "image target"). The image capture device 110 captures a pattern of light 101 (also referred to as "scene light") and converts the captured light to a digital image. For example, the image capture device 110 may be a camera. The display device 130 displays the digital image by reproducing the pattern of light, as display light 104, on a corresponding display surface. Example suitable display devices include televisions, computer monitors, laptops, tablets, and smartphones, among other examples.

The image capture device 110 includes a sensor 112, an opto-electrical transfer function (OETF) 114, a color-space converter (CSC) 116, and an encoder 118. The sensor 112 converts the scene light 101 to an electrical signal ($E_C$). In some implementations, the sensor 112 may include an array of optical sensing elements (such as charge-coupled device (CCD) cells or complementary metal-oxide-semiconductor (CMOS) cells), each configured to sample a respective pixel of the scene light 101. The OETF 114 transforms the electrical signal $E_C$ to coded image data ($RGB_C$) having red (R), green (G), and blue (B) color channels associated with an RGB color space. More specifically, the OETF 114 converts RGB information from an analog domain to a digital domain. For example, the OETF 114 may convert the analog electrical signals $E_C$ to digital R, G, and B values representing the primary color components associated with the sensor 112.

The CSC 116 changes the color space associated with the coded image data $RGB_C$. In some aspects, the CSC 116 may convert the coded image data $RGB_C$ from the RGB color space to another color space that may be easier for the encoder 118 to compress or otherwise encode for transmission to the display device 130 (such as a YUV color space). In some implementations, the CSC 116 may convert the coded image data $RGB_C$ to image data ($YUV_C$) having luma (Y) and chrominance (UV) channels associated with a YUV color space. The encoder 118 encodes the converted image data $YUV_C$, as image capture data 102, for transmission to the image processor 120 or the display device 130. For example, the encoder 118 may apply data compression or signal modulation to the converted image data $YUV_C$ based, at least in part, on various communication standards or protocols supported by the communication medium (not shown for simplicity) or the display device 130.

The image processor 120 processes the image capture data 102 to produce display data 103 that can be used to more accurately or realistically reproduce the original scene light 101 on the display device 130 (given the differences in dynamic range or color gamut supported by the image capture device 110 and the display device 130). For example, display devices that are capable of displaying only standard dynamic range (SDR) content may be unable to reproduce the full range of color, brightness, or contrast of images captured in a high dynamic range (HDR) format. On the other hand, images captured in an SDR format may not utilize the full range of color, brightness, or contrast supported by display devices that are capable of displaying HDR content. Accordingly, the image processor 120 may bridge the image capture capabilities of the image capture device 110 and the image display capabilities of the display device 130. In some aspects, the image processor 120 may be incorporated in the image capture device 110. In some other aspects, the image processor 120 may be incorporated in the image display device 130.

The display device 130 includes a decoder 132, a CSC 134, an electro-optical transfer function (EOTF) 136, and a display 138. The decoder 132 receives the display data 103 from the image processor 120 and decodes the received data to recover display data ($YUV_D$) having Y, U, and V channels associated with a YUV color space. In some implementations, the decoder 132 may reverse the encoding performed by the encoder 118 of the image capture device 110. The CSC 134 changes the color space associated with the recovered image data $YUV_D$. In some aspects, the CSC 134 may convert the recovered image data $YUV_D$ from the YUV color space to another color space that is used by the display 138 for rendering and displaying images (such as an RGB color space). In some implementations, the CSC 134 may convert the image data $YUV_D$ to image data ($RGB_D$) having R, G, and B color channels associated with an RGB color space.

The EOTF 136 transforms the converted image data $RGB_D$ to an electrical signal ($E_D$) that can be used to illuminate the pixels of the display 138. More specifically, the EOTF 136 converts RGB information from a digital domain to an analog domain. For example, the EOTF 136 may convert the digital image data $RGB_D$ to analog brightness values (or "nits") associated with the display 138. The display 138 converts the electrical signal $E_D$ to the display light 104. For example, the display 138 may include an array of pixel elements each configured to display a respective pixel of the corresponding image (such as using cathode ray tube (CRT), liquid crystal display (LCD), organic light emitting diode (OLED), or other display technologies). More specifically, the color and brightness of light output by each pixel element may be defined or otherwise indicated by the characteristics of the electrical signal $E_D$.

The OETF 114 of the image capture device 110 performs a nonlinear transformation on the electrical signal $E_C$. More specifically, the OETF 114 transfers the electrical signal $E_C$ from a linear domain to a nonlinear domain. As a result, the image capture data 102 received by the image processor 120 is nonlinear. Aspects of the present disclosure recognize that many image processing operations are more complex to perform on nonlinear image data than on linear image data. Thus, in some aspects, the image processor 120 may include an inverse opto-electrical transfer function (IOETF) 122, a color volume mapping (CVM) component 123, and an inverse electro-optical transfer function (IEOTF) 124. The IOETF 122 transfers the image capture data 102 back to the linear domain for processing as display data 103. Thus, the IOETF 122 may be the inverse of the OETF 114. The IEOTF 124 transfers the display data 103 back to the nonlinear domain for display by the display device 130. Thus, the IEOTF 124 may be the inverse of the EOTF 136.

The CVM component 123 is configured to map the linear image capture data 102 to the linear display data 103. In some implementations, the CVM component 123 may reduce the color, brightness, or contrast of an HDR image for display on an SDR display device (also referred to as "tone mapping"). In some other implementations, the CVM component 123 may increase the color, brightness, or contrast of an SDR image for display on an HDR display device (also referred to as "inverse tone mapping"). Still further, in some implementations, the CVM component 123 may adjust the color, brightness, or contrast of an HDR image data for display on an HDR display device (such as to compensate for differences in dynamic range or color gamut supported by the image source and the image target).

As described above, the image capture data 102 is encoded based on the converted image data $YUV_C$ having Y, U, and V color channels. As such, the image capture data 102 is also associated with the YUV color space. However, the YUV color space is not a perceptually uniform color space. As such, the brightness, saturation and hue planes are not orthogonal to each other. In other words, changing the luminance range will result in varied amounts of changes in saturation for different hue colors. Similarly, changing the saturation range will result in varied amounts of changes in luminance level for different colors. Thus, performing tone mapping or inverse tone mapping in the YUV color space is more prone to artifacts and may impose a significant penalty on latency, memory, and processing resources, which may not be suitable for many image processing applications (such as for processing video or for implementation in battery-powered devices or other edge devices with limited resources).

Aspects of the present disclosure recognize that image processing overhead can be significantly reduced, without loss of accuracy, by performing tone mapping and inverse tone mapping operations in a perceptually uniform color space (UCS) such as, for example, the $J_z a_z b_z$ color space which is defined by lightness ($J_z$), redness-greenness ($a_z$), and yellowness-blueness ($b_z$) color components. In some aspects, the image processor 120 may convert the image capture data 102 to the $J_z a_z b_z$ color space for image processing. More specifically, the image processor 120 may convert the Y, U, and V channels of the image capture data 102 to $J_z$, $a_z$, and $b_z$ channels associated with the $J_z a_z b_z$ color space. The CVM component 123 may further map the $J_z$, $a_z$, and $b_z$ channels of the image capture data 102 to $J_z$, $a_z$, and $b_z$ channels of the display data 103 based on the dynamic range or color gamut supported by each of the image capture device 110 and the display device 130.

Figure 2:
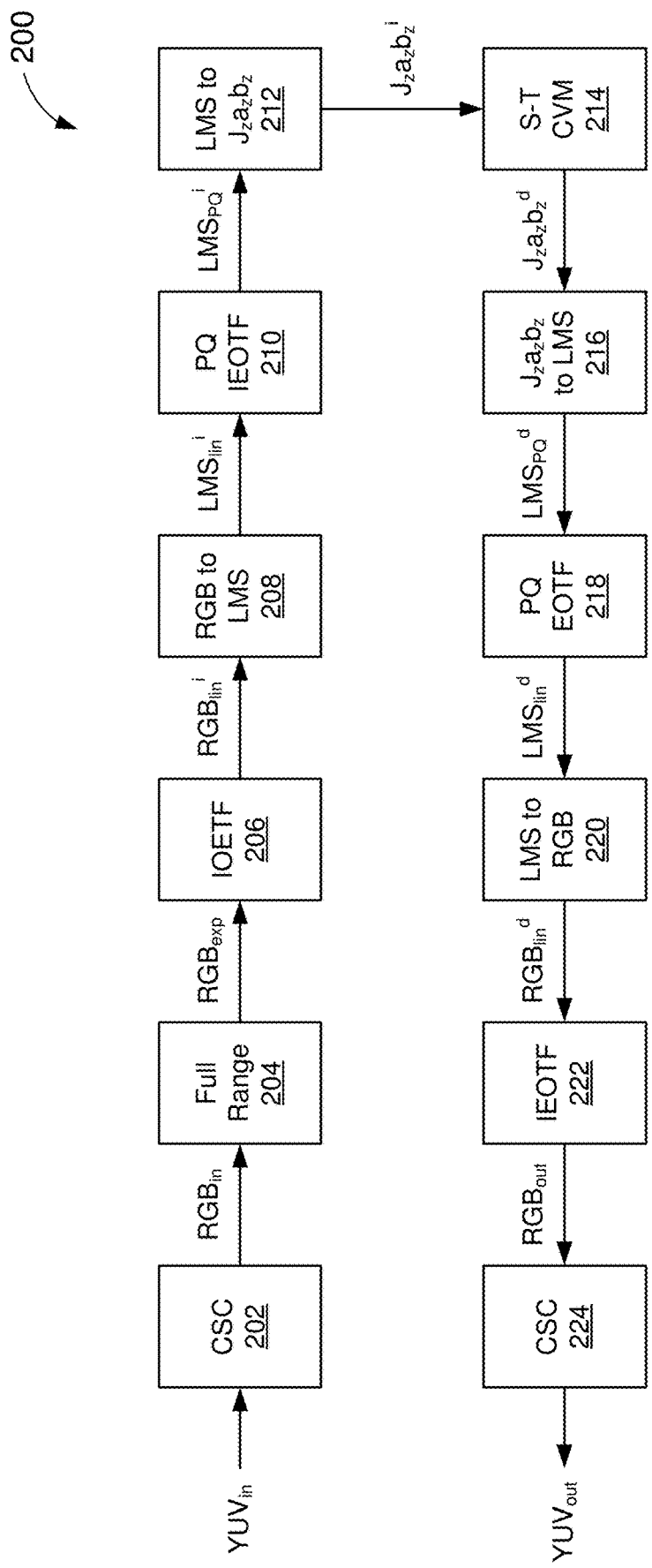
FIG. 2 shows a block diagram of an example image processing system, according to some implementations.

FIG. 2 shows a block diagram of an example image processing system 200, according to some implementations. The image processing system 200 is configured to convert image data ($YUV_{in}$) captured by a source device (such as an image capture device) to display data ($YUV_{out}$) for display by a target device (such as a display device). In some implementations, the image processing system 200 may be one example of the CVM component 123 of FIG. 1. With reference for example to FIG. 1, the image data $YUV_{in}$ may be one example of the image capture data 102 and the display data $YUV_{out}$ may be one example of the display data 103.

The image processing system 200 includes a color-space converter (CSC) 202, a full-range expander 204, an IOETF 206, an RGB to long, medium, short (LMS) CSC 208, a perceptual quantizer (PQ) IEOTF 210, an LMS to $J_z a_z b_z$ CSC 212, a source-to-target (S-T) color volume mapper (CVM) 214, a $J_z a_z b_z$ to LMS CSC 216, a PQ EOTF 218, an LMS to RGB CSC 220, an IEOTF 222, and a CSC 224. The CSC 202 converts the received image data $YUV_{in}$ to image data ($RGB_{in}$) having R, G, and B color channels associated with an RGB color space. In some implementations, the CSC 202 may convert the received image data $YUV_{in}$ from a YUV color space to the RGB color space. In some other implementations, the image processing system 200 may directly receive the image data $RGB_{in}$ in the RGB color space. In such implementations, the CSC 202 may be bypassed or omitted from the image processing system 200.

The full-range expander 204 expands the maximum range of the converted image data $RGB_{in}$ to produce expanded image data ($RGB_{exp}$). For example, the range of digital YUV values may be limited between an artificial minimum ("min") and an artificial maximum ("max") in order to reserve some codes for timing reference purposes. Thus, if the received image data $YUV_{in}$ has been limited (such as between 256 and 3760, in the 12-bit range), then a full-range expansion may cause the expanded image data $RGB_{exp}$ to fall within a predetermined maximum range (such as between 0 and 4095) associated with the RGB color space. When the received image data $YUV_{in}$ is converted to the RGB color space, the range of values associated with the converted image data $RGB_{in}$ may remain the same. Thus, each of the R, G, and B components may be expanded using only a limited set of parameters.

The IOETF 206 transforms the expanded image data $RGB_{exp}$ into linearly-interpolated image data ($RGB_{lin}^{i}$). In some implementations, the IOETF 206 may be the inverse of an OETF implemented by the source device. With reference for example to FIG. 1, the IOETF 206 may be one example of the IOETF 122 of the image processor 120. Thus, the IOETF 206 may be the inverse of the OETF 114 of the image capture device 110. To achieve a high precision IOETF curve while reducing the memory requirements for lookup table (LUT) storage, the IOETF 206 may use a 128 segmented piecewise linear interpolation technique to convert 16-bit RGB components to 32-bit RGB components in the linear domain.

The RGB to LMS CSC 208 converts the linear image data $RGB_{lin}^{i}$ to image data ($LMS_{lin}^{i}$) having long (L), medium (M), and short (S) channels associated with an LMS color space. The L, M, and S channels represent the responses of the three types of cones in the human eye. Thus, the converted image data $LMS_{lin}^{i}$ also may be referred to herein as "perceptual image data." In some implementations, the RGB to LMS CSC 208 may convert the linear image data $RGB_{lin}^{i}$ to the perceptual image data $LMS_{lin}^{i}$ through intermediate conversion to a tristimulus (XYZ) space defined by the Commission Internationale de l'Éclairage (CIE):

$$\begin{bmatrix} X'_{D65} \\ Y'_{D65} \end{bmatrix} = \begin{bmatrix} bX_{D65} \\ gY_{D65} \end{bmatrix} - \begin{bmatrix} (b-1)Z_{D65} \\ (g-1)X_{D65} \end{bmatrix}$$

$$\begin{bmatrix} L \\ M \\ S \end{bmatrix} = \begin{bmatrix} 0.41478972 & 0.579999 & 0.0146480 \\ -0.2015100 & 1.120649 & 0.0531008 \\ 0.0166008 & 0.264800 & 0.6684799 \end{bmatrix} \begin{bmatrix} X'_{D65} \\ Y'_{D65} \\ Z_{D65} \end{bmatrix}$$

where $X_{D65}$, $Y_{D65}$, and $Z_{D65}$ belong to the CIE XYZ tristimulus space with CIE standard illuminant D65 as white point, b=1.15, and g=0.66. Aspects of the present disclosure recognize that any RGB color space can be transformed to the CIE XYZ tristimulus space. Thus, the transformation matrix that is used to transform the image data from the RGB color space to the XYZ color space may depend on the RGB color space implemented by the image processing system 200.

The PQ IEOTF 210 transforms the perceptual image data $LMS_{lin}{}^i$ from the linear domain to the PQ domain. The PQ IEOTF 210 is a nonlinear transfer function adopted by Society of Motion Picture and Television Engineers (SMPTE) and International Telecommunication Union (ITU) standards for HDR display. For example, the PQ domain supports luminance levels in the range of 0.0001 to 10000 nits. Thus, the PQ IEOTF 210 may transform the L, M, and S channels of the perceptual image data $LMS_{lin}{}^i$ into L', M', and S' channels of PQ image data ($LMS_{PQ}{}^i$):

$$\{L', M', S'\} = \left( \frac{c_1 + c_2 \left( \frac{\{L, M, S\}}{10000} \right)^n}{1 + c_3 \left( \frac{\{L, M, S\}}{10000} \right)^n} \right)^p$$

where $c_1 = 3424/2^{12}$, $c_2 = 2413/2^7$, $c_3 = 2392/2^7$, $n = 2610/2^{14}$, and $p = 1.7 \times 2523/2^5$.

The LMS to $J_z a_z b_z$ CSC 212 converts the PQ image data $LMS_{PQ}{}^i$ to image data ($J_z a_z b_z{}^i$) having lightness ($J_z$), redness-greenness ($a_z$), and yellowness-blueness ($b_z$) channels associated with a $J_z a_z b_z$ color space. As described with reference to FIG. 1, the $J_z a_z b_z$ color space is a perceptually uniform. Thus, the converted image data $J_z a_z b_z{}^i$ also may be referred to herein as "perceptually uniform image data." In some implementations, the LMS to $J_z a_z b_z$ CSC 212 may convert the PQ image data $LMS_{PQ}{}^i$ to the perceptually uniform image data $J_z a_z b_z{}^i$ according to Equations 1 and 2, below:

$$\begin{bmatrix} I_z \\ a_z \\ b_z \end{bmatrix} = \begin{bmatrix} 0.5 & 05 & 0 \\ 3.524000 & -4.066708 & 0.542708 \\ 0199076 & 1.096799 & -1.295875 \end{bmatrix} \begin{bmatrix} L' \\ M' \\ S' \end{bmatrix} \quad (1)$$

$$J_z = \frac{(1+d)I_z}{1+dI_z} - d_0 \quad (2)$$

where $d = -0.56$ and $d_0 = 1.6295499532821566 \times 10^{-11}$.

The S-T CVM 214 is configured to map the perceptually uniform image data $J_z a_z b_z{}^i$ to perceptually uniform display data ($J_z a_z b_z{}^d$) that is better suited for presentation on the target device. More specifically, the S-T CVM 214 may map the range of $J_z$, $a_z$, and $b_z$ values supported by the source device to a range of $J_z$, $a_z$, and $b_z$ values supported by the target device. In some implementations, the S-T CVM 214 may reduce the dynamic range associated with the perceptually uniform image data $J_z a_z b_z{}^i$ by mapping the $J_z$ channel of $J_z a_z b_z{}^i$ to a narrower range of $J_z$ values (also referred to as "tone mapping"). In some other implementations, the S-T CVM 214 may increase the dynamic range associated with the perceptually uniform image data $J_z a_z b_z{}^i$ by mapping the $J_z$ channel of $J_z a_z b_z{}^i$ to a wider range of $J_z$ values (also referred to as "inverse tone mapping").

In some implementations, the S-T CVM 214 may reduce the color gamut associated with the perceptually uniform image data $J_z a_z b_z{}^i$ by mapping the $a_z$ and $b_z$ channels of $J_z a_z b_z{}^i$ to a narrower range of $a_z$ and $b_z$ values (also referred to as "saturation mapping"). In some implementations, the S-T CVM 214 may increase the color gamut associated with the perceptually uniform image data $J_z a_z b_z{}^i$ by mapping the $a_z$ and $b_z$ channels of $J_z a_z b_z{}^i$ to a wider range of $a_z$ and $b_z$ values (also referred to as "inverse saturation mapping"). Because the $J_z$ channel is orthogonal to the $a_z$ and $b_z$ channels, the S-T CVM 214 can adjust the tone (or $J_z$ channel) of the perceptually uniform image data $J_z a_z b_z{}^i$ without affecting the saturation of the image. The S-T CVM 214 can also adjust the saturation (or $a_z$ and $b_z$ channels) of the perceptually uniform image data $J_z a_z b_z{}^i$ without affecting the image tone.

The $J_z a_z b_z$ to LMS CSC 216 converts the perceptually uniform display data $J_z a_z b_z{}^d$ to perceptual display data ($LMS_{PQ}{}^d$) having L', M', and S' channels associated with the LMS color space. More specifically, the $J_z a_z b_z$ to LMS CSC 216 may reverse the color-space conversion performed by the LMS to $J_z a_z b_z$ CSC 212. In some implementations, the $J_z a_z b_z$ to LMS CSC 216 may convert the perceptually uniform display data $J_z a_z b_z{}^d$ to the perceptual display data $LMS_{PQ}{}^d$ according to equations 3 and 4, below:

$$I_z = \frac{J_z + d_0}{1 + d - d(J_z + d_0)} \quad (3)$$

$$\begin{bmatrix} L' \\ M' \\ S' \end{bmatrix} = \begin{bmatrix} 0.5 & 0.5 & 0 \\ 3.524000 & -4.066708 & 0.542708 \\ 0.199076 & 1.096799 & -1.295875 \end{bmatrix}^{-1} \begin{bmatrix} I_z \\ a_z \\ b_z \end{bmatrix} \quad (4)$$

where $d = -0.56$ and $d_0 = 1.6295499532821566 \times 10^{-11}$.

The PQ EOTF 218 transforms the perceptual display data $LMS_{PQ}{}^d$ from the PQ domain back to the linear domain. More specifically, the PQ EOTF 218 may be the inverse of the PQ IEOTF 210. Thus, the PQ EOTF 218 may transform the L', M', and S' channels of the perceptual display data $LMS_{PQ}{}^d$ into L, M, and S channels of linear display data ($LMS_{lin}{}^d$):

$$\{L, M, S\} = 10000 * \left( \frac{c_1 - (\{L', M', S'\})^{\frac{1}{p}}}{c_3(\{L', M', S'\})^{\frac{1}{p}} - c_2} \right)^{\frac{1}{n}}$$

where $c_1 = 3424/212$, $c_2 = 2413/27$, $c_3 = 2392/27$, $n = 2610/2^{14}$, and $p = 1.7 \times 2523/2^5$.

The LMS to RGB CSC 220 converts the linear display data $LMS_{lin}{}^d$ to display data ($RGB_{lin}{}^d$) having R, G, and B channels associated with the RGB color space. More specifically, the LMS to RGB CSC 220 may reverse the color-space conversion performed by the RGB to LMS CSC 208. In some implementations, the LMS to RGB CSC 220 may convert the linear display data $LMS_{lin}{}^d$ to the display data $RGB_{lin}{}^d$ through intermediate conversion to the CIE XYZ tristimulus space:

$$\begin{bmatrix} X'_{D65} \\ Y'_{D65} \\ Z'_{D65} \end{bmatrix} = \begin{bmatrix} 0.41478972 & 0.579999 & 0.0146480 \\ -0.2015100 & 1.120649 & 0.0531008 \\ 0.0166008 & 0.264800 & 0.6684799 \end{bmatrix}^{-1} \begin{bmatrix} L \\ M \\ S \end{bmatrix}$$

$$X_{D65} = \frac{X'_{D65} + (b-1)Z_{D65}}{b}$$

$$Y_{D65} = \frac{Y'_{D65} + (g-1)X_{D65}}{g}$$

where b=1.15 and g=0.66. Aspects of the present disclosure recognize that the CIE XYZ tristimulus space can be transformed to any RGB color space. Thus, the transformation matrix that is used to transform the display data from the XYZ color space to the RGB color space may depend on the RGB color space implemented by the image processing system 200.

The IEOTF 222 transforms the converted display data $RGB_{lin}{}^d$ into nonlinear display data ($RGB_{out}$). In some implementations, the IEOTF 222 may be the inverse of an EOTF implemented by the target device. With reference for example to FIG. 1, the IEOTF 222 may be one example of the IEOTF 124 of the image processor 120. Thus, the IEOTF 222 may be the inverse of the EOTF 136 of the image capture device 130. To achieve a high precision IEOTF curve while reducing the memory requirements for LUT storage, the IEOTF 222 may use a 128 segmented piecewise linear interpolation technique to convert 32-bit RGB components to 16-bit RGB components in the nonlinear domain.

The CSC 224 converts the nonlinear display data $RGB_{out}$ to the display data ($YUV_{out}$) for output to the target device. More specifically, the CSC 224 may reverse the color-space conversion performed by the CSC 202. In some implementations, the CSC 224 may convert the display data $RGB_{out}$ from the RGB color space to the YUV color space. In some other implementations, the image processing system 200 may directly output the nonlinear display data $RGB_{out}$ in the RGB color space. In such implementations, the CSC 224 may be bypassed or omitted from the image processing system 200.

Figure 3:
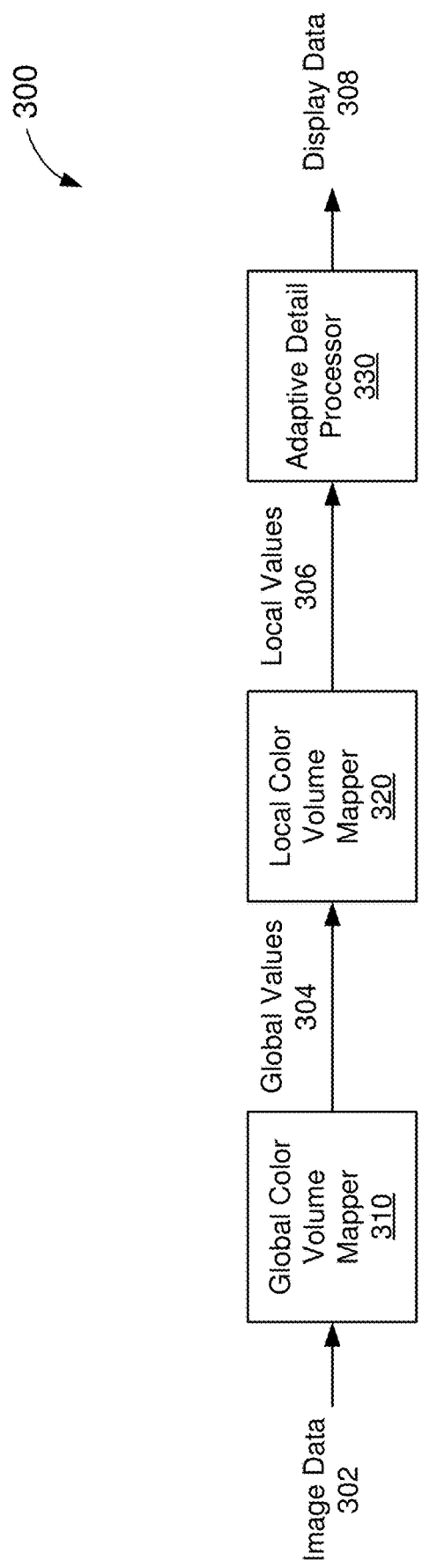
FIG. 3 shows a block diagram of an example color volume mapping (CVM) system, according to some implementations.

FIG. 3 shows a block diagram of an example CVM system 300, according to some implementations. The CVM system 300 is configured to transform image data 302 representing an image captured by a source device into display data 308 that can be used to reproduce the image at a display device. In some implementations, the CVM system 300 may be one example of the CVM component 123 of FIG. 1 or the S-T CVM 214 of FIG. 2. With reference for example to FIG. 2, the image data 302 may be one example of the perceptually uniform image data $J_z a_z b_z{}^i$ and the display data 308 may be one example of the perceptually uniform display data $J_z a_z b_z{}^d$. Thus, each of the image data 302 and the display data 308 includes $J_z$, $a_z$, and $b_z$ channels associated with the $J_z a_z b_z$ color space.

The CVM system 300 includes a global color volume mapper 310, a local color volume mapper 320, and an adaptive detail processor 330. The global color volume mapper 310 is configured to map the received image data 302 to a set of global color values 304 associated with the $J_z a_z b_z$ color space based on the dynamic range and color gamut supported by each of the source device and the target device. For example, the range of $J_z$ values that can be included in the image data 302 is bounded or limited by the dynamic range of the source device and the range of $a_z$ and $b_z$ values that can be included in the image data 302 is bounded or limited by the color gamut of the source device. By contrast, the range of $J_z$ values that can be included among the global color values 304 is bounded or limited by the dynamic range of the target device and the range of $a_z$ and $b_z$ values that can be included among the global color values 304 is bounded or limited by the color gamut supported of target device.

In some aspects, the global color volume mapper 310 may map the range of $J_z$, $a_z$, and $b_z$ values supported by the source device to the range of $J_z$, $a_z$, and $b_z$ values supported by the target device (such as through expansion or compaction of each range of values) and may determine the set of global color values 304 based on the "global" mapping between the source device and the target device. In some implementations, the global color volume mapper 310 may map the $J_z$ channels of the image data 302 to the $J_z$ channels of the global color values 304 based on a tone mapping operation or an inverse tone mapping operation. In some other implementations, the global color volume mapper 310 may map the $a_z$ and $b_z$ channels of the image data 302 to the $a_z$ and $b_z$ channels of the global color values 304 based on a saturation mapping operation or an inverse saturation mapping operation.

The local color volume mapper 320 is configured to remap the set of global color values 304 to a set of local color values 306 based on various properties of the corresponding image. Aspects of the present disclosure recognize that the human visual system can perceive more details in darker and brighter regions of an image compared to the mid-tones. However, some image details may fade in the darker or brighter regions of the image as a result of mapping the $J_z$ channel of the image data 302 to the $J_z$ channel of the global color values 304 through global expansion (or compaction) of the dynamic range. In some aspects, the local color volume mapper 320 may dynamically tune the global color values 304 so that details are preserved in the darker and brighter regions of the image. For example, the $J_z$ channel of the local color values 306 may span a wider range of dark tones than mid-tones and may span the widest range of bright (or "highlight") tones.

Aspects of the present disclosure also recognize that a global expansion of saturation values may not produce optimized colors for various objects in any given scene. More specifically, different levels of saturation may be more aesthetically pleasing to the human eye for different types of content. For example, bluer skies and greener grass may be visually appealing in the context of an outdoor sports scene but may be distracting in the context of a movie scene (for at least some genres of film). In some aspects, the local color volume mapper 320 may dynamically tune the global color values 304 based on contextual information about the image. For example, the local color volume mapper 320 may determine a classification associated with various objects or features in the image and may remap the $a_z$ and $b_z$ channels of the global color values 304 to $a_z$ and $b_z$ channels of the local color values based on the determined classifications.

The adaptive detail processor 330 may further remap the local color values 306 to the display data 308 based on details detected in the corresponding image. Aspects of the present disclosure recognize that, as a result of expanding the dark and highlight tones, high-frequency details may become lost in low-contrast regions of the image depicted by the local color values 306. For example, individual blades of grass on a football field may be difficult to discern due to the stretching of tones at the edges of the grass. In some aspects, the adaptive detail processor 330 may adaptively tune the local color values 306 so that high-frequency details are preserved in low-contrast regions of the image depicted by the display data 308. More specifically, the adaptive detail processor 330 may detect the edges of objects or features in the image and adaptively blend the $J_z$ channel of the local color values 306 at the detected edges based on the contrast of the surrounding region.

Figure 4:
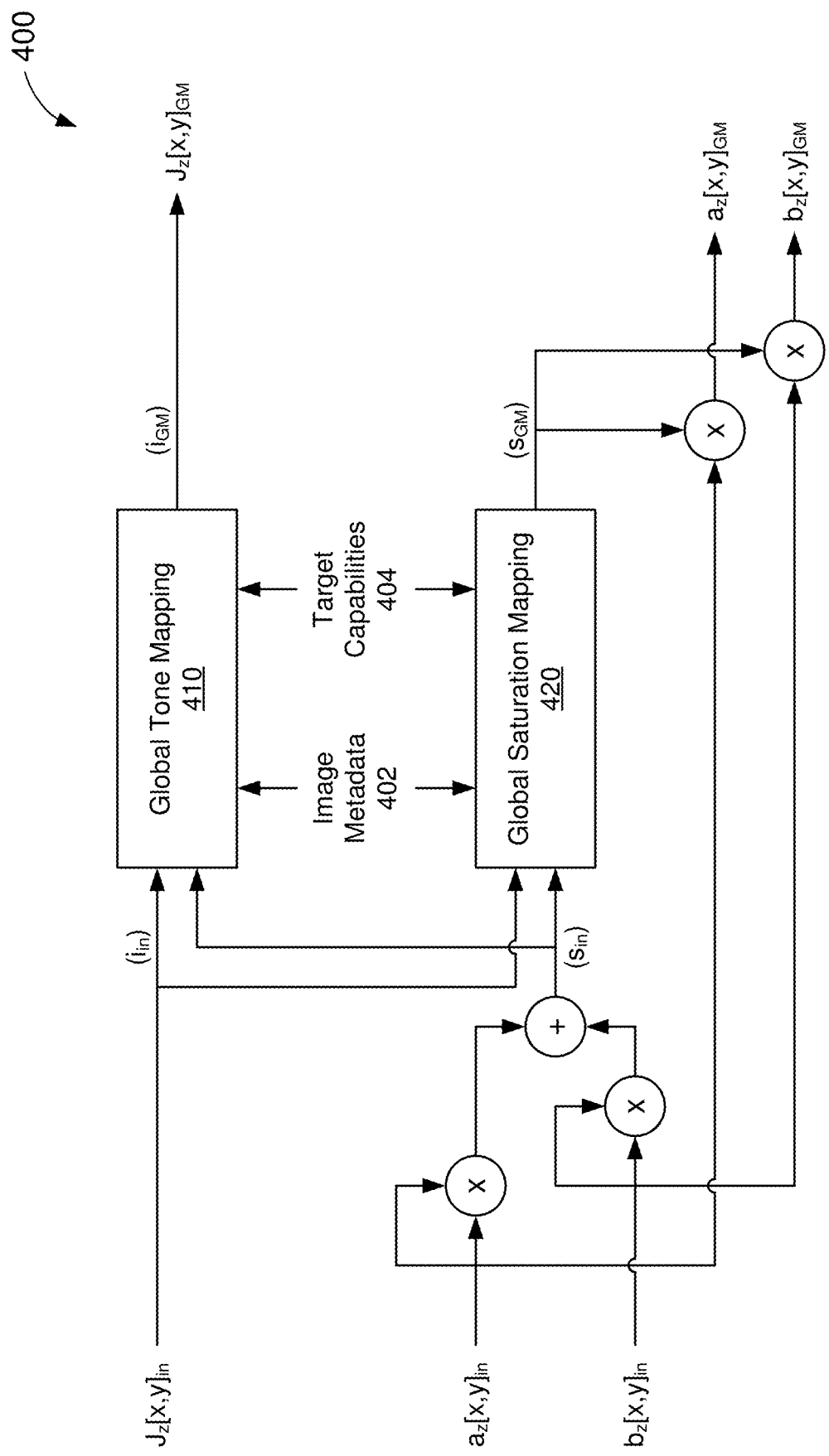
FIG. 4 shows a block diagram of an example system for global CVM, according to some implementations.

FIG. 4 shows a block diagram of an example system 400 for global CVM, according to some implementations. The system 400 is configured to map $J_z$, $a_z$, and $b_z$ channels of image data ($\{J_z[x,y]_{in}, a_z[x,y]_{in}, b_z[x,y]_{in}\}$, where x and y denote horizontal and vertical pixel coordinates) to $J_z$, $a_z$, and $b_z$ channels of global display data ($\{J_z[x,y]_{GM}, a_z[x,y]_{GM}, b_z[x,y]_{GM}\}$). In some implementations, the system 400 may be one example of the global color volume mapper 310 of FIG. 3. With reference for example to FIG. 3, the image data $\{J_z[x,y]_{in}, a_z[x,y]_{in}, b_z[x,y]_{in}\}$ may be one example of the image data 302 and the display data $\{J_z[x,y]_{GM}, a_z[x,y]_{GM}, b_z[x,y]_{GM}\}$ may be one example of the global color values 304.

The system 400 includes a global tone mapping component 410 and a global saturation mapping component 420. In some aspects, the system 400 may convert the image data $\{J_z[x,y]_{in}, a_z[x,y]_{in}, b_z[x,y]_{in}\}$ to intensity ($i_{in}$) and saturation ($s_{in}$) values, where $i_{in} = J_z[x,y]_{in}$ and $s_{in} = a_z[xy]_{in} * b_z[x,y]_{in}$. The global tone mapping component 410 is configured to map the $i_{in}$ and $s_{in}$ values to a global intensity value ($i_{GM}$) based on source image metadata 402 associated with the received image data and target capabilities 404 associated with the target device. The global saturation mapping component 420 is configured to map the $i_{in}$ and $s_{in}$ values to a global saturation value ($S_{GM}$) based on the image metadata 402 and the target capabilities 404.

The target capabilities 404 may include any known capabilities of the target device such as, for example, a dynamic range or color gamut supported by the target device. By contrast, the source image metadata 402 may be received with the image data and may indicate a dynamic range or color gamut of a mastering display (used to author or "master" the image data). Example suitable metadata may include color calibration data associated with the mastering display, a maximum frame average light level (MaxFALL), a maximum content light level (MaxCLL), RGB primaries, white point, or display maximum and minimum light levels, among other examples. In some implementations, the source image metadata 402 may include static metadata that is broadly applicable to a series of images (or multiple frames of video). In some other implementations, the source image metadata 402 may include dynamic metadata that is specific to the received image data.

In some implementations, the global tone mapping component 410 may map the $i_{in}$ and $s_{in}$ values to an $i_{GM}$ value based on a source to target tone mapping operator in intensity axis (TI) lookup table (LUT) and a source to target tone mapping operator in saturation axis (TS) LUT. Because the $J_z a_z b_z$ color space is a perceptually uniform color space and the $J_z$ channel is perfectly orthogonal to the $a_z$ and $b_z$ channels, the color volume mapping operation is isotropic and can be implemented by one-dimensional (1D) LUTs associated with each tone and saturation axis. For example, the global tone mapping component 410 may look up the tone map for the intensity value $i_{in}$ in the TI LUT and may look up the tone map for the saturation value $s_{in}$ in the TS LUT, where the TI and TS LUTs are 1 D LUTs and where $i_{GM} = TI[i_{in}] * TS[s_{in}]$. In some implementations, the global tone mapping component 410 may determine or generate the TI LUT and the TS LUT based on the source image metadata 402, the target capabilities 404, or any combination thereof. In some aspects, the system 400 may further convert the global intensity value $i_{GM}$ to the $J_z$ channel of the global display data, where $J_z[x,y]_{GM} = i_{GM}$.

In some implementations, the global saturation mapping component 420 may map the $i_{in}$ and $s_{in}$ values to an $S_{GM}$ value based on a source to target color saturation mapping operator in intensity axis (SI) LUT and a source to target color saturation mapping operator in saturation axis (SS) LUT. Because the $J_z a_z b_z$ color space is a perceptually uniform color space, the global saturation mapping operation is isotropic in nature, and requires only 1 D operators associated with each intensity and saturation axis. For example, the global saturation mapping component 420 may look up the saturation mapping for the intensity value $i_{in}$ in the SI LUT and may look up the saturation mapping for the saturation value $S_{in}$ in the SS LUT, where the SI and SS LUTs are 2D LUTs and where $S_{GM} = SI[i_{in}] * SS[S_{in}]$. In some implementations, the global saturation mapping component 420 may determine or generate the SI LUT and the SS LUT based on the source image metadata 402, the target capabilities 404, or any combination thereof. In some aspects, the system 400 may further convert the global saturation value $S_{GM}$ to the $a_z$ and $b_z$ channels of the global display data, where $a_z[xy]_{GM} = a_z[xy]_{in} * S_{GM}$ and $b_z[x,y]_{GM} = b_z[x,y]_{in} * S_{GM}$.

Figure 5:
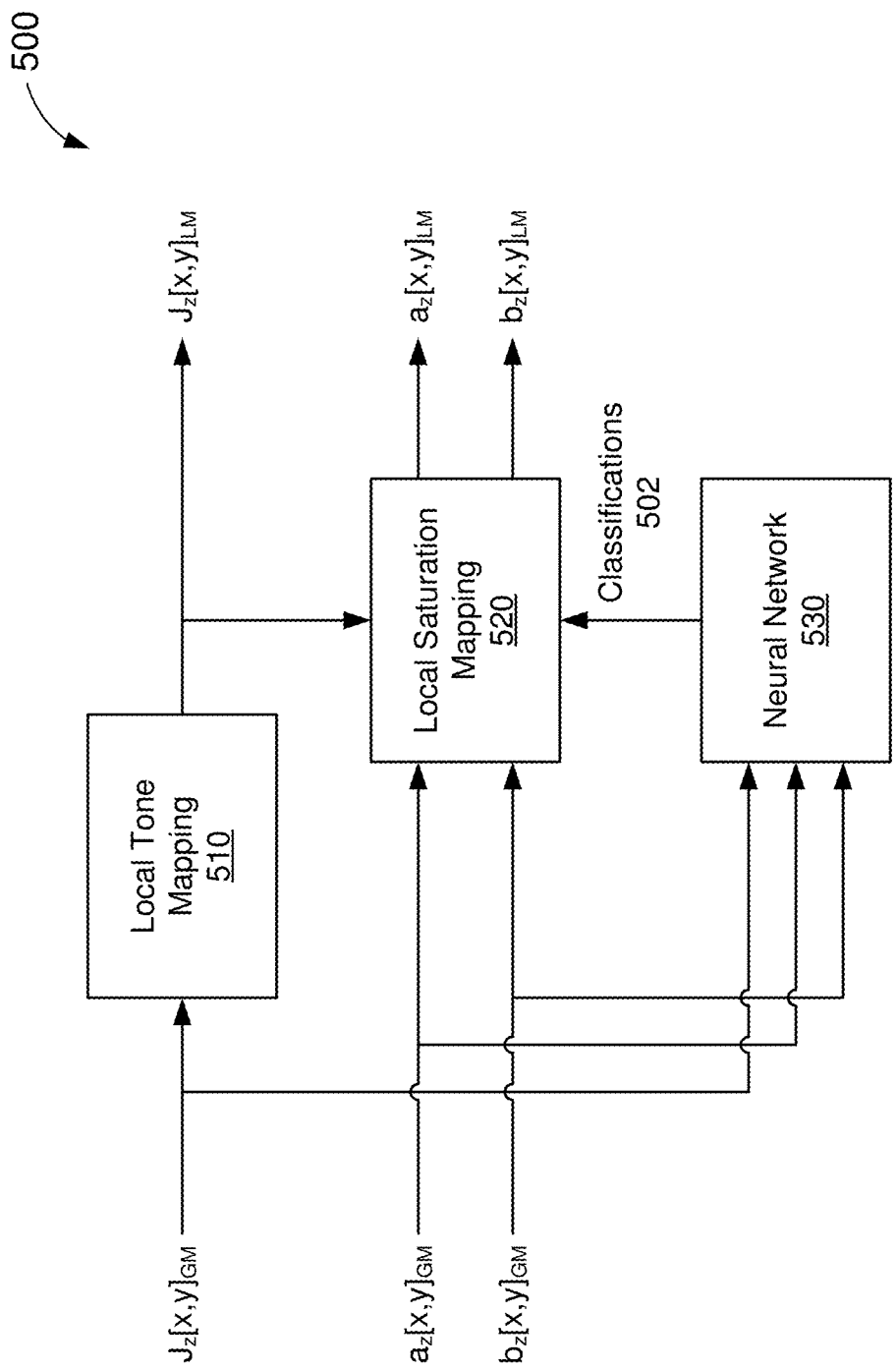
FIG. 5 shows a block diagram of an example system for local CVM, according to some implementations.

FIG. 5 shows a block diagram of an example system 500 for local CVM, according to some implementations. The system 500 is configured to map $J_z$, $a_z$, and $b_z$ channels of global display data ($\{J_z[x,y]_{GM}, a_z[x,y]_{GM}, b_z[x,y]_{GM}\}$) to $J_z$, $a_z$, and $b_z$ channels of local display data ($\{J_z[x,y]_{LM}, a_z[x,y]_{LM}, b_z[x,y]_{LM}\}$). In some implementations, the system 500 may be one example of the local color volume mapper 320 of FIG. 3. With reference for example to FIG. 3, the global display data $\{J_z[x,y]_{GM}, a_z[x,y]_{GM}, b_z[x,y]_{GM}\}$ may be one example of the global color values 304 and the local display data $\{J_z[x,y]_{LM}, a_z[x,y]_{LM}, b_z[x,y]_{LM}\}$ may be one example of the local color values 306.

The system 500 includes a local tone mapping component 510 and a local saturation mapping component 520. The local tone mapping component 510 is configured to map the $J_z$ channel of the global display data $J_z[x,y]_{GM}$ to the $J_z$ channel of the local display data $J_z[x,y]_{LM}$. In some aspects, the local tone mapping component 510 may perform the mapping based, at least in part, on a distribution of the values of $J_z[x,y]_{GM}$. More specifically, the mapping may improve the contrast of the image while preserving details in the darker and brighter regions of the image. In some implementations, the local tone mapping component 510 may perform histogram equalization on the $J_z$ channel of the global display data $J_z[x,y]_{GM}$. Histogram equalization is a technique for increasing the contrast of an image by spreading out or redistributing a relatively narrow range of tone values over a wider range.

Aspects of the present disclosure recognize that the human visual system can perceive more details in darker and brighter regions of an image compared to the mid-tones. Thus, in some implementations, the local tone mapping component 510 may perform histogram equalization on independent bands of tones. As used herein, a "band" refers to a range of tones that does not overlap with any other band. For example, each tone value associated with the $J_z$ channel of the global display data $J_z[x,y]_{GM}$ may fall within a spectrum that is partitioned or subdivided into "dark," "mid," and "highlight" bands. The local tone mapping component 510 may perform a separate histogram equalization operation on the tone values within each of the dark, mid, and highlight bands so that the tone values in a given band do not cross over to another band as a result of the histogram equalization.

The local saturation mapping component 520 is configured to map the $a_z$ and $b_z$ channels of the global display data $a_z[x,y]_{GM}$ and $b_z[x,y]_{GM}$ to the $a_z$ and $b_z$ channels of the local display data $a_z[x,y]_{LM}$ and $b_z[x,y]_{LM}$. Aspects of the present disclosure recognize that the brightness of an image may affect the perception of colors in the image. Thus, in some implementations, the local saturation mapping component 520 may perform the mapping based, at least in part, on the $J_z$ channel of the local display data $J_z[x,y]_{LM}$. For example, the local saturation mapping component 520 may adjust the hue ($h_z$) or chroma ($C_z$) of a given pixel based on the value of $J_z[x,y]_{LM}$, where:

$$h_z = \arctan\left(\frac{b_z}{a_z}\right) \quad (5)$$

$$C_z = \sqrt{a_z^2 + b_z^2} \quad (6)$$

In some implementations, the local saturation mapping component 520 may further map the $a_z$ and $b_z$ channels of the global display data $a_z[x,y]_{GM}$ and $b_z[x,y]_{GM}$ to the $a_z$ and $b_z$ channels of the local display data $a_z[x,y]_{LM}$ and $b_z[x,y]_{LM}$ based, at least in part, on classifications 502 of one or more objects or features in the image. The classifications 502 provide contextual information about the objects or features that can be used to determine optimal colors for displaying such objects or features on the target device. For example, if the classification 502 associated with a particular object indicates that the object is a human face, the local saturation mapping component 520 may tune the hue $h_z$ and chroma $C_z$ of the object (using Equations 5 and 6) to match a skin tone that is known to appear more natural on the target device.

In some aspects, the classifications 502 may be inferred by a neural network 530. Example suitable neural networks may include various types of deep neural networks (DNNs), such as convolutional neural networks (CNNs) or recurrent neural networks (RNNs), among other examples. In some implementations, the neural network 530 may infer the classifications 502 based on one or more channels of the global display data {$J_z[x,y]_{GM}$, $a_z[x,y]_{GM}$, $b_z[x,y]_{GM}$} (such as shown in FIG. 5). In some other implementations, the neural network 530 may infer the classifications 502 based on other data associated with the image (not shown for simplicity). Example suitable data may include metadata (such as the image metadata 402 of FIG. 4) or image data from which the global display data is derived (such as the image data 302 of FIG. 3).

Figure 6:
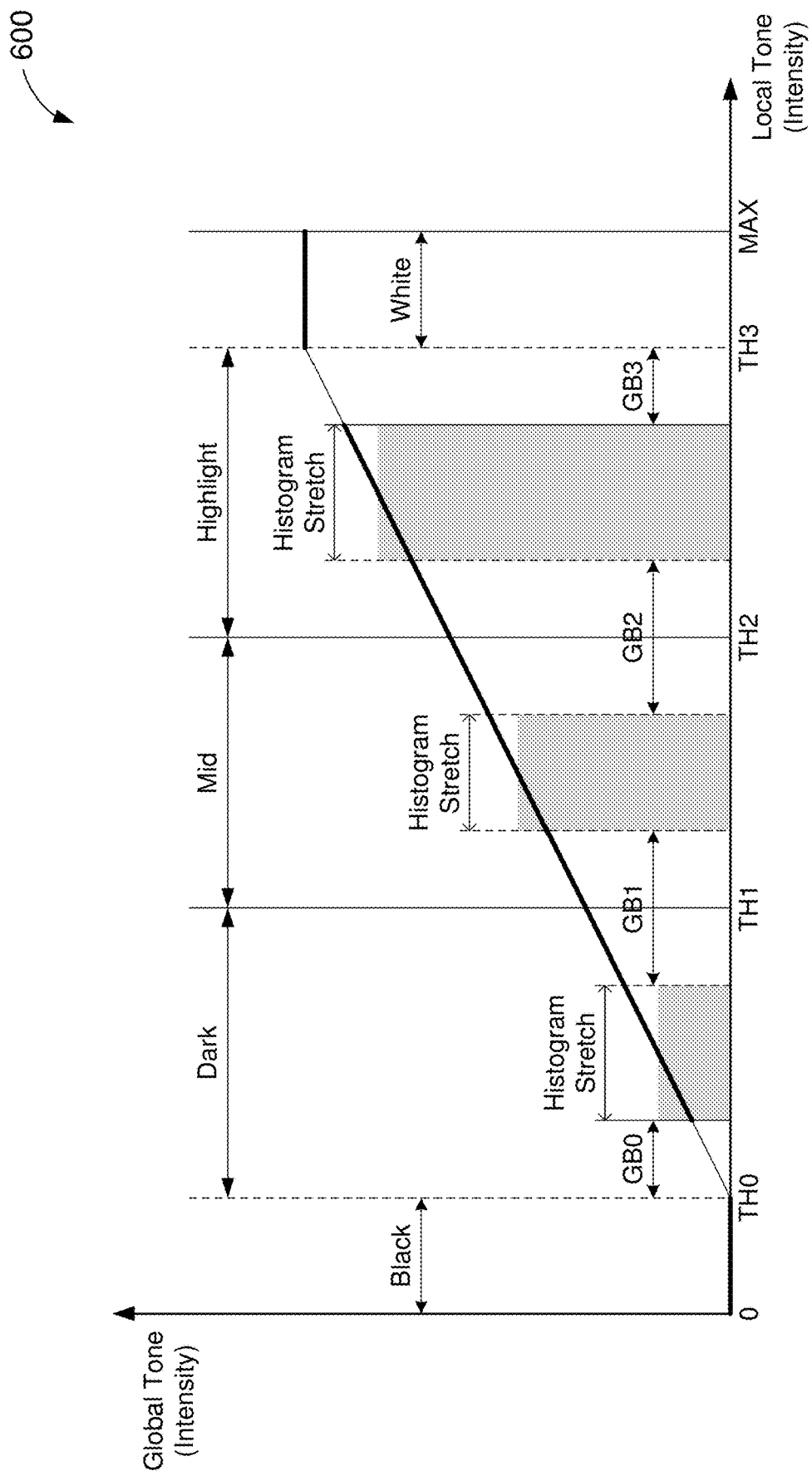
FIG. 6 shows an example mapping of global pixel tone values to local pixel tone values with adaptive histogram equalization.

FIG. 6 shows an example mapping 600 of global pixel tone (or intensity) values to local pixel tone (or intensity) values with adaptive histogram equalization. In some implementations, the mapping 600 may be performed by the local tone mapping component 510 of FIG. 5. With reference for example to FIG. 5, the global pixel tone values may be one example of the $J_z$ channel of the global display data $J_z[x,y]_{GM}$ and the local pixel tone values may be one example of the $J_z$ channel of the local display data $J_z[x,y]_{LM}$.

In the example of FIG. 6, global pixel tone values (such as the values of $J_z[x,y]_{GM}$) are depicted along a vertical axis and local pixel tone values (such as the values of $J_z[x,y]_{LM}$) are depicted along on a horizontal axis. The mapping 600 is represented by a curve that extends, along the horizontal axis, between a minimum intensity threshold (TH0) and a maximum intensity threshold (TH3). As shown in FIG. 6, the range of intensity values between TH0 and TH3 represents a spectrum that is subdivided into "dark," "mid," and "highlight" bands. More specifically, the dark band is bounded by the minimum intensity threshold TH0 and a first intensity threshold (TH1), the mid band is bounded by the first intensity threshold TH1 and a second intensity threshold (TH2), and the highlight band is bounded by the second intensity threshold TH2 and the maximum intensity threshold TH3.

As described with reference to FIG. 5, the local tone mapping component 510 may perform histogram equalization on the global pixel tone values within each of the dark, mid, and highlight bands. In other words, the mapping 600 may redistribute or "stretch" the pixel tone values within each band. For example, within the dark band, the local tone mapping component 510 may remap the values of $J_z[x,y]_{GM}$ so that the resulting values of $J_z[x,y]_{LM}$ are more evenly distributed but remain bounded by the thresholds TH0 and TH1. Similarly, within the mid band, the local tone mapping component 510 may remap the values of $J_z[x,y]_{GM}$ so that the resulting values of $J_z[x,y]_{LM}$ are more evenly distributed but remain bounded by the thresholds TH1 and TH2. Also, within the highlight band, the local tone mapping component 510 may remap the values of $J_z[x,y]_{GM}$ so that the resulting values of $J_z[x,y]_{LM}$ are more evenly distributed but remain bounded by the thresholds TH2 and TH3.

In some implementations, guard bands may be used to maintain a sufficient amount of separation between the local pixel tone values in each of the dark, mid, and highlight bands (such as to avoid crushing pixel intensities as a result of histogram stretching). For example, a first guard band (GB0) provides a buffer between black pixel values and the next-darkest local pixel tone values; a second guard band (GB1) provides a buffer between the local pixel tone values in the dark band and the local pixel tone values in the mid band; a third guard band (GB2) provides a buffer between the local pixel tone values in the mid band and the local pixel tone values in the highlight band; and a fourth guard band (GB3) provides a buffer between white pixel values and the next-highest local pixel tone values.

Aspects of the present disclosure recognize that the human visual system can perceive more details in dark regions of an image compared to the mid-tones. Thus, in some implementations, the dark band may span a wider range of pixel intensities than the mid band (such that TH0–TH1>TH1–TH2). As such, the dark band may support greater amounts of histogram stretching than in the mid band. Aspects of the present disclosure further recognize that the human visual system can perceive even more details in bright regions of an image compared to the dark regions. Thus, in some implementations, the highlight band may span a wider range of pixel intensities than the dark band (such that TH2–TH3>TH0–TH1). As such, the highlight band may support greater amounts of histogram stretching than the dark band and the mid band.

Figure 7:
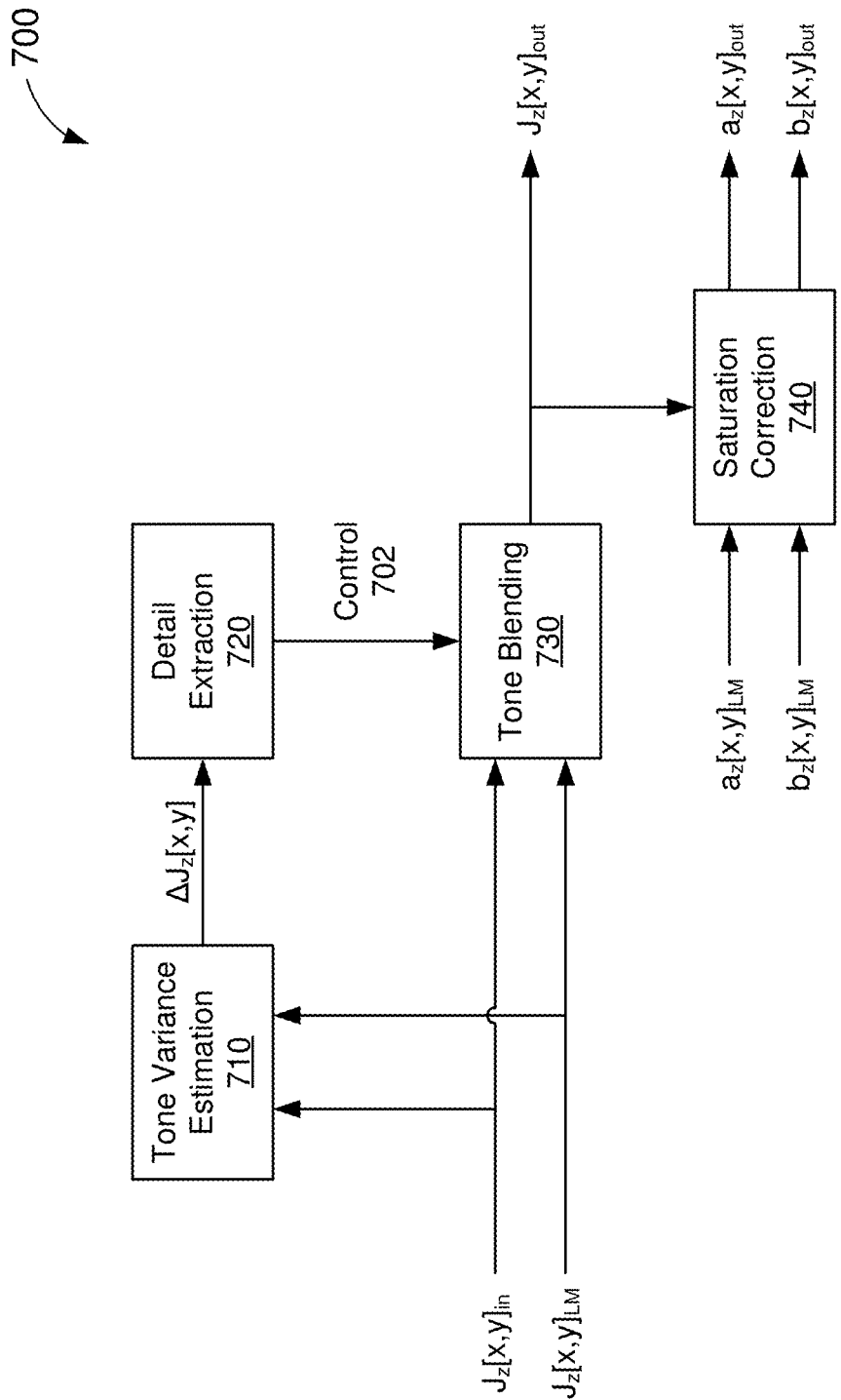
FIG. 7 shows a block diagram of an example adaptive detail processor, according to some implementations.

FIG. 7 shows a block diagram of an example system 700 for adaptive detail processing, according to some implementations. The system 700 is configured to map $J_z$, $a_z$, and $b_z$ channels of local display data ({$J_z[x,y]_{LM}$, $a_z[x,y]_{LM}$, $b_z[x,y]_{LM}$}) to $J_z$, $a_z$, and $b_z$ channels of output display data ({$J_z[x,y]_{out}$, $a_z[x,y]_{out}$, $b_z[x,y]_{out}$}). In some implementations, the system 700 may be one example of the adaptive detail processor 330 of FIG. 3. With reference for example to FIG. 3, the local display data {$J_z[x,y]_{LM}$, $a_z[x,y]_{LM}$, $b_z[x,y]_{LM}$} may be one example of the local color values 306 and the output display data $\{J_z[x,y]_{out}, a_z[x,y]_{out}, b_z[x,y]_{out}\}$ may be one example of the display data 308.

The system 700 includes a tone variance estimation component 710, a detail extraction component 720, a tone blending component 730, and a saturation correction component 740. The tone variance estimation component 710 is configured to determine a difference ($\Delta J_z[x,y]$) between the $J_z$ channel of the local display data $J_z[x,y]_{LM}$ and the $J_z$ channel of the original image data ($J_z[x,y]_{in}$) from which the local display data is derived (where $\Delta J_z[x,y]=|J_z[x,y]_{LM}-J_z[x,y]_{in}|$). For example, the original image data may be one example of the image data $\{J_z[x,y]_{in}, a_z[x,y]_{in}, b_z[x,y]_{in}\}$ of FIG. 4 or the image data 302 of FIG. 3.

The detail extraction component 720 is configured to detect edges or textures in the image based on the values of $\Delta J_z[x,y]$. In some aspects, the detail extraction component 720 may produce a control signal 702 based, at least in part, on the detected edges or textures. More specifically, the control signal 702 may indicate whether each pixel value is associated with a flat region or a textured region of the image. In some implementations, where a pixel value is associated with a textured region of the image, the control signal 702 may further indicate an amount of contrast associated with the textured region.

The tone blending component 730 is configured to produce the $J_z$ channel of the output display data $J_z[x,y]_{out}$ based on the $J_z$ channel of the image data $J_z[x,y]_{in}$, the $J_z$ channel of the local display data $J_z[x,y]_{LM}$, and the control signal 702. More specifically, each value of $J_z[x,y]_{out}$ may be a blend of a respective value of $J_z[x,y]_{in}$ and a respective value of $J_z[x,y]_{LM}$. In some implementations, the tone blending component 730 may control or adjust the amount of blending based on the control signal 702 to preserve high-frequency details in low-contrast regions of the image.

For example, the tone blending component 730 may refrain from blending the value of $J_z[x,y]_{LM}$ with a respective value of $J_z[x,y]_{in}$ if the control signal 702 indicates that the pixel value is associated with a flat region of the image. As a result, the value of $J_z[x,y]_{out}$ may be equal to the value of $J_z[x,y]_{LM}$ for pixel values associated with flat regions of the image ($J_z[x,y]_{out}=J_z[x,y]_{LM}$). By contrast, the tone blending component 730 may blend the value of $J_z[x,y]_{LM}$ with a respective value of $J_z[x,y]_{in}$ if the control signal 702 indicates that the pixel value is associated with a textured region of the image. As a result, the value of $J_z[x,y]_{out}$ may be a combination of the values of $J_z[x,y]_{LM}$ and $J_z[x,y]_{in}$ for pixel values associated with texture regions of the image ($J_z[x,y]_{out}=\alpha J_z[x,y]_{LM}+\beta J_z[x,y]_{in}$, where $\alpha$ and $\beta$ depend on the amount of contrast in the region).

The saturation correction component 740 is configured to map the $a_z$ and $b_z$ channels of the local display data $a_z[x,y]_{LM}$ and $b_z[x,y]_{LM}$ to the $a_z$ and $b_z$ channels of the output display data $a_z[x,y]_{out}$ and $b_z[x,y]_{out}$ based on the $J_z$ channel of the output display data $J_z[x,y]_{out}$. As described with reference to FIG. 5, the brightness of an image may affect the perception of colors in the image. Thus, in some implementations, the local saturation mapping component 520 may adjust the hue $h_z$ and chroma $C_z$ of a given pixel (using Equations 5 and 6) to compensate for any changes made to the brightness of the pixel (such as by the tone blending component 730).

Figure 8:
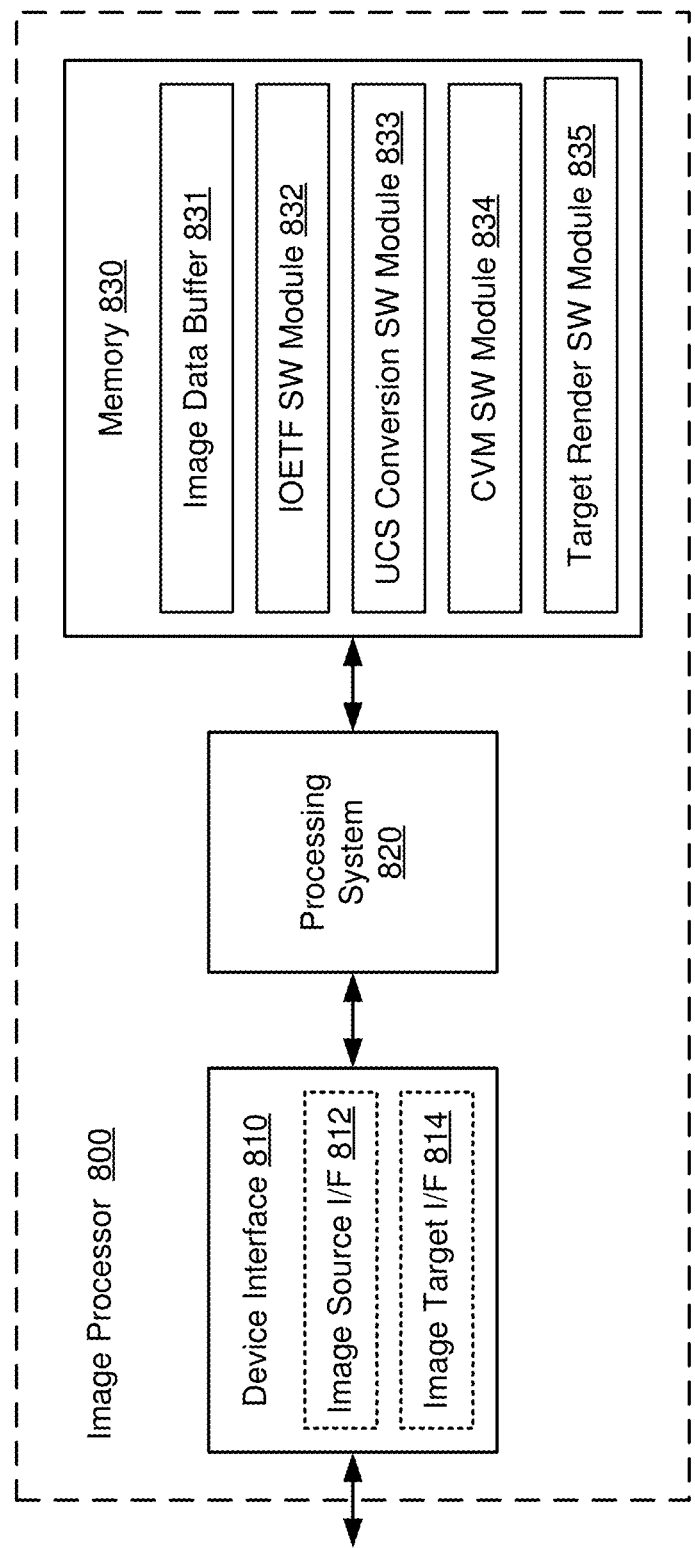
FIG. 8 shows another block diagram of an example image processing system, according to some implementations.

FIG. 8 shows another block diagram of an example image processing system 800, according to some implementations. The image processing system 800 is configured to convert image data captured by a source device (such as an image capture device) to display data for display by a target device (such as a display device). In some implementations, the image processing system 800 may be one example of the image processor 120 of FIG. 1 or the image processing system 200 of FIG. 2.

The image processing system 800 includes a device interface 810, a processing system 820, and a memory 830. The device interface 810 is configured to communicate with the source device and the target device. In some implementations, the device interface 810 may include an image source interface (I/F) 812 and an image target interface 814. The image source interface 812 is configured to receive the image data from the source device. In some implementations, the image source interface 812 may receive first image data representing an image produced by an image capture device based on an opto-electric transfer function (OETF). The image target interface 814 is configured to provide the display data to the target device.

The memory 830 includes an image data buffer 831 configured to store the received image data and any intermediate data resulting from the image processing operation. The memory 830 also includes a non-transitory computer-readable medium (including one or more nonvolatile memory elements, such as EPROM, EEPROM, Flash memory, or a hard drive, among other examples) that may store at least the following software (SW) modules:

- an inverse opto-electric transfer function (IOETF) SW module 832 to transform the first image data into second image data based on an inverse of the OETF associated with the image capture device, where the second image data includes red (R), green (G), and blue (B) channels associated with an RGB color space;
- a uniform color space (UCS) conversion SW module 833 to convert the second image data to third image data having lightness ($J_z$), redness-greenness ($a_z$), and yellowness-blueness ($b_z$) channels associated with a $J_za_zb_z$ color space;
- a color volume mapping (CVM) SW module 834 to map the $J_z$, $a_z$, and $b_z$ channels of the third image data to $J_z$, $a_z$, and $b_z$ channels of first display data based at least in part on a dynamic range or color gamut associated with a display device; and
- a target render SW module 835 to process the first display data for display by the display device.

Each software module includes instructions that, when executed by the processing system 820, causes the image processing system 800 to perform the corresponding functions.

The processing system 820 may include any suitable one or more processors capable of executing scripts or instructions of one or more software programs stored in the image processing system 800 (such as in the memory 830). For example, the processing system 820 may execute the IOETF SW module 832 to transform the first image data into second image data based on an inverse of the OETF associated with the image capture device, where the second image data includes R, G, and B channels associated with an RGB color space. The processing system 820 also may execute the UCS conversion SW module 833 to convert the second image data to third image data having $J_z$, $a_z$, and $b_z$ channels associated with a $J_za_zb_z$ color space. The processing system 820 may further execute the CVM SW module 834 to map the $J_z$, $a_z$, and $b_z$ channels of the third image data to $J_z$, $a_z$, and $b_z$ channels of first display data based at least in part on a dynamic range or color gamut associated with a display device. Still further, the processing system 820 may execute the target render SW module 835 to process the first display data for display by the display device.

Figure 9:
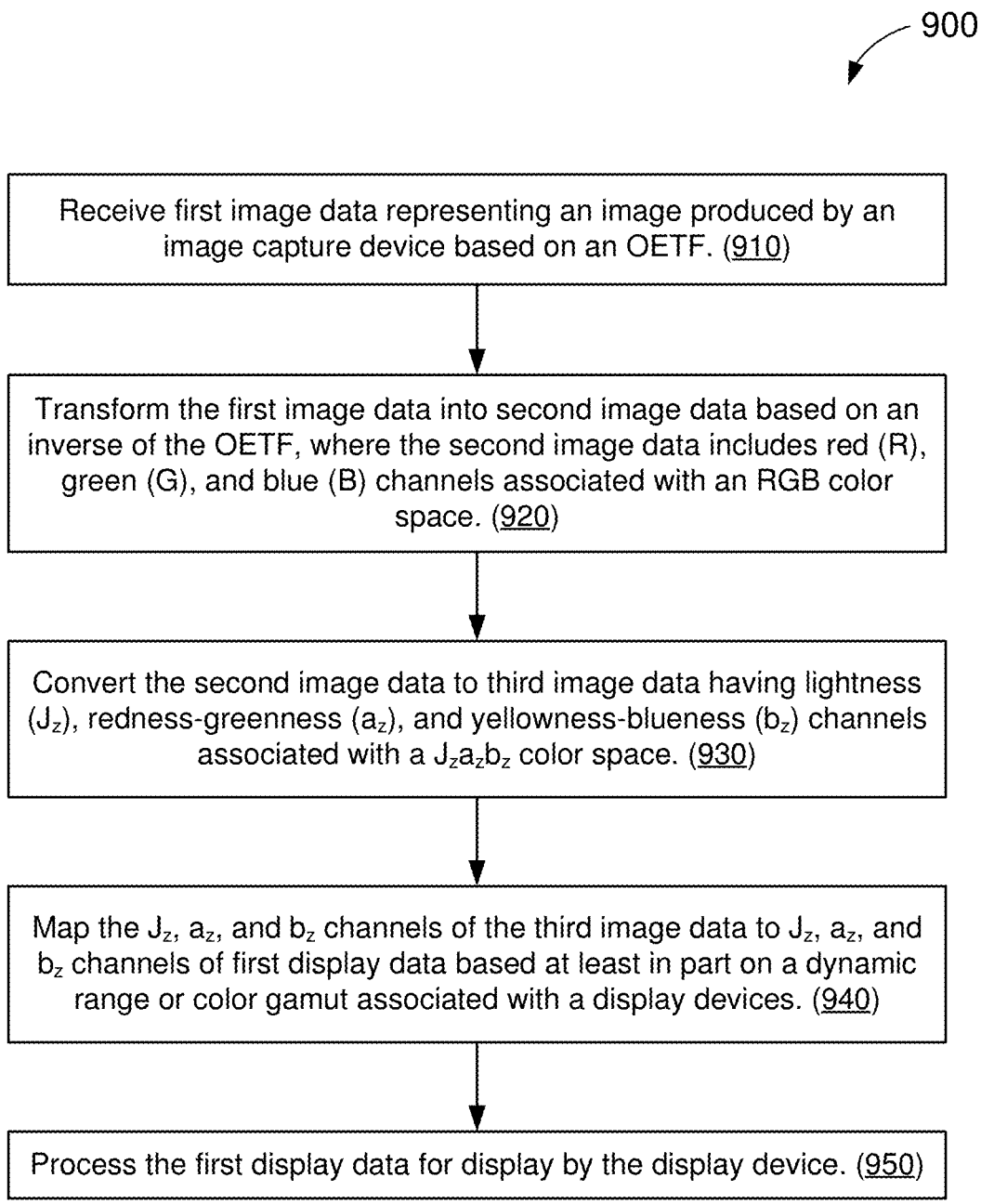
FIG. 9 shows an illustrative flowchart depicting an example operation for image processing, according to some implementations.

FIG. 9 shows an illustrative flowchart depicting an example operation 900 for image processing, according to some implementations. In some implementations, the example operation 900 may be performed by an image processing system (such as the image processor 120 of FIG. 1 or any of the image processing systems 200 or 800 of FIGS. 2 and 8, respectively).

The image processing system receives first image data representing an image produced by an image capture device based on an OETF (910). The image processing system transforms the first image data into second image data based on an inverse of the OETF, where the second image data includes red (R), green (G), and blue (B) channels associated with an RGB color space (920). The image processing system further converts the second image data to third image data having lightness ($J_z$), redness-greenness ($a_z$), and yellowness-blueness ($b_z$) channels associated with a $J_z a_z b_z$ color space (930). The image processing system maps the $J_z$, $a_z$, and $b_z$ channels of the third image data to $J_z$, $a_z$, and $b_z$ channels of first display data based at least in part on a dynamic range or color gamut associated with a display device (940). The image processing system processes the first display data for display by the display device (950).

In some implementations, the converting of the second image data to the third image data may include converting the second image data to fourth image data having long (L), medium (M), and short (S) channels associated with an LMS color space; transforming the fourth image data into fifth image data based on a perceptual quantizer (PQ) transfer function; and converting the fifth image data to the third image data in a PQ domain associated with the PQ transfer function.

In some aspects, the image processing system may further receive metadata associated with the first image data, where the metadata indicates a dynamic range or color gamut associated with a mastering display. In some implementations, the metadata may include color calibration data associated with the mastering display, a maximum frame average light level, a maximum content light level, RGB primaries, white point, or display maximum and minimum light levels.

In some implementations, the mapping of the $J_z$, $a_z$, and $b_z$ channels of the third image data to the $J_z$, $a_z$, and $b_z$ channels of the first display data may include generating a plurality of lookup tables (LUTs) based at least in part on the received metadata and the dynamic range or color gamut associated with the display device; mapping the $J_z$, $a_z$, and $b_z$ channels of the third image data to the $J_z$ channel of the first display data based at least in part on one or more first LUTs of the plurality of LUTs; and mapping the $J_z$, $a_z$, and $b_z$ channels of the third image data to the $a_z$ and $b_z$ channels of the first display data based at least in part on one or more second LUTs of the plurality of LUTs.

In some implementations, the mapping of the $J_z$, $a_z$, and $b_z$ channels of the third image data to the $a_z$ and $b_z$ channels of the first display data may include mapping the $J_z$, $a_z$, and $b_z$ channels of the third image data to global saturation values based on the one or more second LUTs; classifying one or more features in the image based on a neural network model; and remapping the global saturation values to the $a_z$ and $b_z$ channels of the first display data based at least in part on the classifications of the one or more features.

In some implementations, the mapping of the $J_z$, $a_z$, and $b_z$ channels of the third image data to the $J_z$ channel of the first display data may include mapping the $J_z$, $a_z$, and $b_z$ channels of the third image data to global tone values within a spectrum of values based on the one or more first LUTs, where the spectrum is partitioned into a plurality of bands; and remapping the global tone values in each band of the plurality of bands to respective equalized tone values within the band based on histogram equalization of the global tone values.

In some implementations, the mapping of the $J_z$, $a_z$, and $b_z$ channels of the third image data to the $J_z$ channel of the first display data may further include extracting details in the image based on differences between the equalized tone values and the $J_z$ channel of the third image data; and adjusting the equalized tone values based on the extracted details.

In some implementations, the mapping of the $J_z$, $a_z$, and $b_z$ channels of the third image data to the $a_z$ and $b_z$ channels of the first display data may include mapping the $J_z$, $a_z$, and $b_z$ channels of the third image data to global saturation values based on the one or more second LUTs; and dynamically adjusting the global saturation values based at least in part on the equalized tone values.

In some implementations, the processing of the first display data may include converting the first display data to second display data having R, G, and B channels associated with the RGB color space; and transforming the second display data into third display data based on an inverse of an EOTF associated with the display device.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of image processing, comprising:
receiving first image data representing an image produced by an image capture device based on an opto-electrical transfer function (OETF);
transforming the first image data into second image data based on an inverse of the OETF, the second image data having red (R), green (G), and blue (B) channels associated with an RGB color space;
converting the second image data to third image data having lightness ($J_z$), redness-greenness ($a_z$), and yellowness-blueness ($b_z$) channels associated with a $J_z a_z b_z$ color space;
mapping the $J_z$, $a_z$, and $b_z$ channels of the third image data to $J_z$, $a_z$, and $b_z$ channels of first display data based at least in part on a dynamic range or color gamut associated with a display device; and
processing the first display data for display by the display device.

2. The method of claim 1, wherein the converting of the second image data to the third image data comprises:
converting the second image data to fourth image data having long (L), medium (M), and short (S) channels associated with an LMS color space;
transforming the fourth image data into fifth image data based on a perceptual quantizer (PQ) transfer function; and
converting the fifth image data to the third image data in a PQ domain associated with the PQ transfer function.

3. The method of claim 1, further comprising:
receiving metadata associated with the first image data, the metadata indicating a dynamic range or color gamut associated with a mastering display.

4. The method of claim 3, wherein the metadata includes color calibration data associated with the mastering display, a maximum frame average light level, a maximum content light level, RGB primaries, white point, or display maximum and minimum light levels.

5. The method of claim 3, wherein the mapping of the $J_z$, $a_z$, and $b_z$ channels of the third image data to the $J_z$, $a_z$, and $b_z$ channels of the first display data comprises:
generating a plurality of lookup tables (LUTs) based at least in part on the received metadata and the dynamic range or color gamut associated with the display device;
mapping the $J_z$, $a_z$, and $b_z$ channels of the third image data to the $J_z$ channel of the first display data based at least in part on one or more first LUTs of the plurality of LUTs; and
mapping the $J_z$, $a_z$, and $b_z$ channels of the third image data to the $a_z$ and $b_z$ channels of the first display data based at least in part on one or more second LUTs of the plurality of LUTs.

6. The method of claim 5, wherein the mapping of the $J_z$, $a_z$, and $b_z$ channels of the third image data to the $a_z$ and $b_z$ channels of the first display data comprises:
mapping the $J_z$, $a_z$, and $b_z$ channels of the third image data to global saturation values based on the one or more second LUTs;
classifying one or more features in the image based on a neural network model; and
remapping the global saturation values to the $a_z$ and $b_z$ channels of the first display data based at least in part on the classifications of the one or more features.

7. The method of claim 5, wherein the mapping of the $J_z$, $a_z$, and $b_z$ channels of the third image data to the $J_z$ channel of the first display data comprises:
mapping the $J_z$, $a_z$, and $b_z$ channels of the third image data to global tone values within a spectrum of values based on the one or more first LUTs, the spectrum being partitioned into a plurality of bands; and
remapping the global tone values in each band of the plurality of bands to respective equalized tone values within the band based on histogram equalization of the global tone values.

8. The method of claim 7, wherein the mapping of the $J_z$, $a_z$, and $b_z$ channels of the third image data to the $J_z$ channel of the first display data further comprises:
extracting details in the image based on differences between the equalized tone values and the $J_z$ channel of the third image data; and
adjusting the equalized tone values based on the extracted details.

9. The method of claim 8, wherein the adjusting of the equalized tone values comprises:
selectively blending the equalized tone values with the $J_z$ channel of the third image data.

10. The method of claim 9, further comprising:
determining whether each pixel of the image is associated with a flat region or a textured region, the selective blending of the equalized tone values being based on whether each pixel of the image is associated with a flat region or a textured region.

11. The method of claim 7, wherein the mapping of the $J_z$, $a_z$, and $b_z$ channels of the third image data to the $a_z$ and $b_z$ channels of the first display data comprises:
mapping the $J_z$, $a_z$, and $b_z$ channels of the third image data to global saturation values based on the one or more second LUTs; and
dynamically adjusting the global saturation values based at least in part on the equalized tone values.

12. The method of claim 1, wherein the processing of the first display data comprises:
converting the first display data to second display data having R, G, and B channels associated with the RGB color space; and
transforming the second display data into third display data based on an inverse of an electro-optical transfer function (EDTF) associated with the display device.

13. An image processor comprising:
a processing system; and
a memory storing instructions that, when executed by the processing system, causes the image processor to:
receive first image data representing an image produced by an image capture device based on an opto-electrical transfer function (OETF);
transform the first image data into second image data based on an inverse of the OETF, the second image data having red (R), green (G), and blue (B) channels associated with an RGB color space;
convert the second image data to third image data having lightness ($J_z$), redness-greenness ($a_z$), and yellowness-blueness ($b_z$) channels associated with a $J_z a_z b_z$ color space;
map the $J_z$, $a_z$, and $b_z$ channels of the third image data to $J_z$, $a_z$, and $b_z$ channels of first display data based at least in part on a dynamic range or color gamut associated with a display device; and
process the first display data for display by the display device.

14. The image processor of claim 13, wherein the converting of the second image data to the third image data comprises:
  converting the second image data to fourth image data having long (L), medium (M), and short (S) channels associated with an LMS color space;
  transforming the fourth image data into fifth image data based on a perceptual quantizer (PQ) transfer function; and
  converting the fifth image data to the third image data in a PQ domain associated with the PQ transfer function.

15. The image processor of claim 13, wherein execution of the instructions further causes the image processor to:
  receive metadata associated with the first image data, the metadata indicating a dynamic range or color gamut associated with a mastering display.

16. The image processor of claim 15, wherein the mapping of the $J_z$, $a_z$, and $b_z$ channels of the third image data to the $J_z$, $a_z$, and $b_z$ channels of the first display data comprises:
  generating a plurality of lookup tables (LUTs) based at least in part on the received metadata and the dynamic range or color gamut associated with the display device;
  mapping the $J_z$, $a_z$, and $b_z$ channels of the third image data to the $J_z$ channel of the first display data based at least in part on one or more first LUTs of the plurality of LUTs; and
  mapping the $J_z$, $a_z$, and $b_z$ channels of the third image data to the $a_z$ and $b_z$ channels of the first display data based at least in part on one or more second LUTs of the plurality of LUTs.

17. The image processor of claim 16, wherein the mapping of the $J_z$, $a_z$, and $b_z$ channels of the third image data to the $a_z$ and $b_z$ channels of the first display data comprises:
  mapping the $J_z$, $a_z$, and $b_z$ channels of the third image data to global saturation values based on the one or more second LUTs;
  classifying one or more features in the image based on a neural network model; and
  remapping the global saturation values to the $a_z$ and $b_z$ channels of the first display data based at least in part on the classifications.

18. The image processor of claim 16, wherein the mapping of the $J_z$, $a_z$, and $b_z$ channels of the third image data to the $J_z$ channel of the first display data further comprises:
  extracting details in the image based on differences between the equalized tone values and the $J_z$ channel of the third image data; and
  adjusting the equalized tone values based on the extracted details.

19. The image processor of claim 18, wherein the mapping of the $J_z$, $a_z$, and $b_z$ channels of the third image data to the $a_z$ and $b_z$ channels of the first display data comprises:
  mapping the $J_z$, $a_z$, and $b_z$ channels of the third image data to global saturation values based on the one or more second LUTs; and
  dynamically adjusting the global saturation values based at least in part on the equalized tone values.

20. The image processor of claim 18, wherein the mapping of the $J_z$, $a_z$, and $b_z$ channels of the third image data to the $J_z$ channel of the first display data comprises:
  mapping the $J_z$, $a_z$, and $b_z$ channels of the third image data to global tone values within a spectrum of values based on the one or more first LUTs, the spectrum being partitioned into a plurality of bands; and
  remapping the global tone values in each band of the plurality of bands to respective equalized tone values in the band based on histogram equalization of the global tone values.

* * * * *

UNITED STATES PATENT AND TRADEMARK OFFICE
CERTIFICATE OF CORRECTION

PATENT NO. : 12,430,732 B2
APPLICATION NO. : 18/322926
DATED : September 30, 2025
INVENTOR(S) : Chandranath Manchi It is certified that error appears in the above-identified patent and that said Letters Patent is hereby corrected as shown below:

In the Claims

Column 22, Line 46, Claim 12:
"function (EDTF) associated with the display device."

Should read:
"function (EOTF) associated with the display device."

Column 24, Lines 8-15, Claim 18 reads:
"The image processor of claim 16, wherein the mapping of the $J_z$, $a_z$, and $b_z$ channels of the third image data to the $J_z$ channel of the first display data further comprises:
    extracting details in the image based on differences between the equalized tone values and the $J_z$ channel of the third image data; and
    adjusting the equalized tone values based on the extracted details."

But should read:
"The image processor of claim 16, wherein the mapping of the $J_z$, $a_z$, and $b_z$ channels of the third image data to the $J_z$ channel of the first display data comprises:
    mapping the $J_z$, $a_z$, and $b_z$ channels of the third image data to global tone values within a spectrum of values based on the one or more first LUTs, the spectrum being partitioned into a plurality of bands; and
    remapping the global tone values in each band of the plurality of bands to respective equalized tone values in the band based on histogram equalization of the global tone values."

Column 24, Lines 16-23, Claim 19 reads:
"The image processor of claim 18, wherein the mapping of the $J_z$, $a_z$, and $b_z$ channels of the third image data to the $a_z$, and $b_z$ channels of the first display data comprises:
    mapping the $J_z$, $a_z$, and $b_z$ channels of the third image data to global saturation values based on the one or more second LUTs; and Signed and Sealed this
Second Day of December, 2025

John A. Squires
*Director of the United States Patent and Trademark Office*

CERTIFICATE OF CORRECTION (continued)
U.S. Pat. No. 12,430,732 B2 dynamically adjusting the global saturation values based at least in part on the equalized tone values."

But should read:
"The image processor of claim 18, wherein the mapping of the $J_z$, $a_z$, and $b_z$ channels of the third image data to the $J_z$ channel of the first display data further comprises:
       extracting details in the image based on differences between the equalized tone values and the $J_z$ channel of the third image data; and
       adjusting the equalized tone values based on the extracted details."

Column 24, Lines 24-34, Claim 20 reads:
"The image processor of 18, wherein the mapping of the $J_z$, $a_z$, and $b_z$ channels of the third image data to the $J_z$ channel of the first display data comprises:
       mapping the $J_z$, $a_z$, and $b_z$ channels of the third image data to global tone values within a spectrum of values based on the one or more first LUTs, the spectrum being partitioned into a plurality of bands; and
       remapping the global tone values in each band of the plurality of bands to respective equalized tone values in the band based on histogram equalization of the global tone values."

But should read:
"The image processor of claim 18, wherein the mapping of the $J_z$, $a_z$, and $b_z$ channels of the third image data to the $a_z$, and $b_z$ channels of the first display data comprises:
       mapping the $J_z$, $a_z$, and $b_z$ channels of the third image data to global saturation values based on the one or more second LUTs; and
       dynamically adjusting the global saturation values based at least in part on the equalized tone values."